(12) United States Patent
Gennai

(10) Patent No.: US 7,665,753 B2
(45) Date of Patent: Feb. 23, 2010

(54) INSERT PIN FOR LEAF SPRING SUSPENSION

(75) Inventor: Takeo Gennai, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 420 days.

(21) Appl. No.: 11/470,328

(22) Filed: Sep. 6, 2006

(65) Prior Publication Data

US 2007/0182074 A1 Aug. 9, 2007

Related U.S. Application Data

(60) Provisional application No. 60/765,941, filed on Feb. 7, 2006.

(51) Int. Cl.
*B60G 11/004* (2006.01)
(52) U.S. Cl. .................. 280/124.174; 267/47; 267/52
(58) Field of Classification Search .......... 280/124.174; 267/52, 47, 46
See application file for complete search history.

(56) References Cited

U.S. PATENT DOCUMENTS

| 720,914 | A | | 2/1903 | Harty | |
|---|---|---|---|---|---|
| 1,390,649 | A | * | 9/1921 | Slater | 267/47 |
| 1,623,422 | A | * | 4/1927 | Lovejoy | 267/36.1 |
| 1,970,765 | A | | 8/1934 | Parkhill | |
| 1,987,189 | A | | 1/1935 | Geyer | |
| 2,161,838 | A | | 6/1939 | Thompson | |
| 2,204,940 | A | * | 6/1940 | Mainard | 267/47 |
| 2,693,354 | A | * | 11/1954 | Walter et al. | 267/262 |
| 2,695,780 | A | | 11/1954 | Blair et al. | |
| 2,819,896 | A | * | 1/1958 | Watson | 267/49 |
| 4,022,449 | A | * | 5/1977 | Estorff | 267/48 |

FOREIGN PATENT DOCUMENTS

JP 277335 6/1990

OTHER PUBLICATIONS

Wikipedia Encyclopedia;Title: Corvette Leaf Springs; pp. 1-2 http://en.wikipedia.org/wiki/Corvette_leaf_springs.
Car Bibles; The Suspension Bible; pp. 1-19 www.carbibles.com/suspension_bible.html.

* cited by examiner

*Primary Examiner*—Paul N. Dickson
*Assistant Examiner*—Timothy Wilhelm
(74) *Attorney, Agent, or Firm*—Gifford, Krass, Spinkle, Anderson & Citkowski, P.C.

(57) ABSTRACT

A leaf spring suspension includes a plurality of leaf springs fixedly secured together by a bolt in the form of a stack. A first leaf spring of the plurality of leaf springs has ends configured to be coupled to a vehicle frame. A pin extends through each leaf spring except for the first leaf spring to prevent splaying between the leaf springs during transverse loading of the suspension.

20 Claims, 2 Drawing Sheets

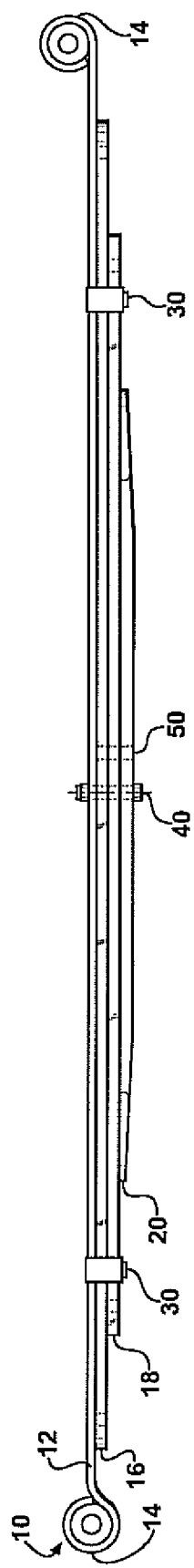
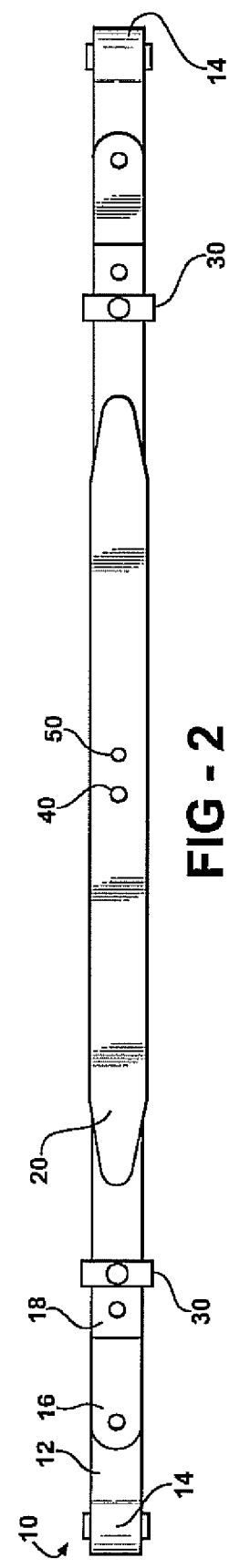

US 7,665,753 B2

INSERT PIN FOR LEAF SPRING SUSPENSION

CROSS REFERENCE TO RELATED APPLICATION

This application claims priority to U.S. provisional patent application No. 60/765,941, which was filed on Feb. 7, 2006 and is incorporated herein by reference in its entirety.

BACKGROUND OF THE INVENTION

1. Field of the Invention

The invention relates to a leaf spring suspension assembly for an automotive vehicle. More particularly, the invention relates to a leaf spring suspension having a pin preventing relative transverse displacement between the sleeves.

2. Description of the Related Art

Automotive vehicles typically include a suspension for coupling a wheel to a vehicle body. Suspensions serve a dual purpose of contributing to the car's handling and braking for good active safety and driving pleasure, and keeping vehicle occupants comfortable and reasonably isolated from road noise, bumps, and vibrations. All suspensions utilize some form of a spring to absorb impact associated with the wheel rolling over a road. For example, a coil suspension uses a helical coil spring that is continuously compressed between a fixed point on the vehicle frame and a pivotable linkage in the suspension.

Another type of suspension is a leaf spring suspension, which utilizes a slender arc-shaped length of spring steel having a generally rectangular cross section. The center of the arc is configured to support the axle, while tie holes are provided at opposite ends for attaching to the vehicle body. A leaf spring suspension may include several leaves clamped together in a stack having several layers. A multilayer leaf suspension typically uses systematically shorter leaves with the longest leaf being directly coupled to the vehicle body. Conventional leaf spring suspensions are not well suited to handling transverse loads on the vehicle, such as those experienced during a high speed turn. The transverse loading may cause the leaves to separate or "splay" relative to each other, which then adversely affects the handling characteristics of the suspension. It is known to insert a pin through a bore formed in each leaf of the suspension in order to prevent relative transverse movement between the leaves. However, providing a bore in the leaf springs introduces an undesired stress concentration, particularly in the longest leaf that is directly coupled to the vehicle.

Accordingly, it remains desirable to provide a leaf suspension design that prevents separation or splaying between the leaf springs during transverse loading of the suspension and at the same time minimizes or eliminates undesired stress concentrations in the leaf that is directly coupled to the vehicle frame.

SUMMARY OF THE INVENTION

According to one aspect of the invention a vehicle suspension is provided with a plurality of leaf springs and a pin. Each leaf spring has a generally rectangular cross section. Each leaf spring has opposite ends and a middle section extending therebetween. The middle sections of the leaf springs are clampingly secured to each other so that the leaf springs form a stack. A first leaf spring of the plurality of leaf springs has ends adapted to be pivotally coupled to a vehicle frame. The pin extends through each leaf spring other than the first leaf spring for preventing separation between the leaf springs and for minimizing stress concentrations in the first leaf spring during loading of the vehicle suspension.

According to another aspect of the invention, a vehicle suspension includes a plurality of leaf springs and a pin. Each leaf spring has a generally rectangular cross section. Each leaf spring has opposite ends and a middle section extending therebetween. The middle sections of the leaf springs are clampingly secured to each other so that the leaf springs form a stack. A first leaf spring in the stack has ends adapted to be pivotally coupled to a vehicle frame. A second leaf spring in the stack is disposed adjacent the first leaf spring. A hole is formed in a side of the second leaf spring opposite the first leaf spring and extends through a portion of a thickness of the second leaf spring. Each leaf spring other than the first and second leaf springs has a bore extending therethrough. A pin extends through the bores of each leaf spring and into the hole of the second leaf spring for preventing separation between the leaf springs and for minimizing stress concentrations in the first leaf spring during loading of the vehicle suspension.

BRIEF DESCRIPTION OF THE DRAWINGS

Advantages of the present invention will be readily appreciated as the same becomes better understood by reference to the following detailed description when considered in connection with the accompanying drawing, wherein:

FIG. 1 is a side elevational view of the leaf spring suspension according to the invention;

FIG. 2 is a top elevational view of the leaf spring suspension of FIG. 1;

DETAILED DESCRIPTION OF THE INVENTION

Figure 3:
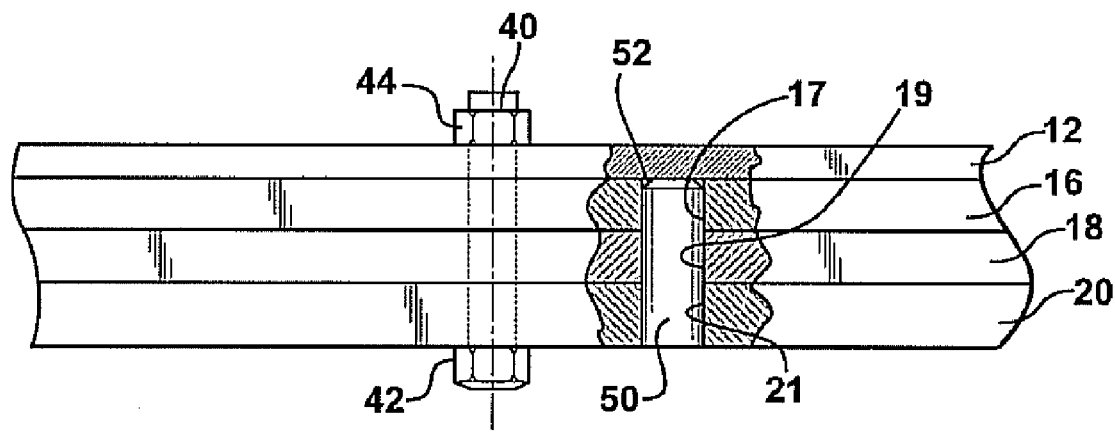
FIG. 3 is an enlarged side view of the leaf spring suspension of FIG. 1 cutaway to show a pin extending through a portion of the stack of leaf springs.

The invention provides a leaf spring suspension having a plurality of leafs and a pin. The pin extends through all except at least one of the layers to prevent relative transverse displacement or splaying between the layers Referring to FIG. 1, the leaf spring suspension according to the invention is generally indicated at 10. The suspension 10 includes a plurality of leaf springs 12, 16, 18, 20 arranged in layers in a single stack. The springs 12, 16, 18, 20 each have a generally rectangular cross section. The springs 12, 16, 18, 20 may be formed of spring steel, composites, or other suitable materials known by those having ordinary skill in the art. The first leaf spring 12 is the longest and extends between ends 14 that are adapted to be pivotally coupled to the vehicle body. The last leaf spring 20 is the shortest. The leaf springs 16, 18 in the middle are incrementally shorter going from the first 12 to the last 20 leaf spring. In the embodiment shown in the figures, the suspension includes a total of four leaf springs, though it should be readily appreciated by those having ordinary skill in the art that three or more than four leaf springs may be used with the invention A bolt 40 extends through a center portion of each leaf spring 12, 16, 18, 20. The leaf springs 12, 16, 18, 20 are clamped together between a head 42 of the bolt 40 and a nut 44 threaded onto the opposite end of the bolt 40. As shown in FIGS. 1 and 2, the first three leaf springs 12, 16, 18 are held together near the ends of the third leaf spring 18 by clamps 30.

A bore 17, 19, 21 is formed in all of the leaf springs 16, 18, 20, except for the first leaf spring 12. The bores 17, 19, 21 are aligned generally coaxially and are offset relative to the center of the suspension 10, which is generally indicated by the position of the bores 17, 19, 21. A pin 50 extends through each of the bores 17, 19, 21. Thus, the pin 50 extends through all of the leaf springs 16, 18, 20 except for the first leaf spring 12.

The pin 50 is spaced apart from and generally parallel with the bolt 40. The distance between the pin 50 and the bolt 40 is such that the pin 50 does not interfere with the flexing motion of the suspension 10 during use. More particularly, the pin 50 is spaced apart from the bolt 40 by a distance that is less than one fourth of the length of the shortest leaf spring 20.

In one embodiment of the invention, the bolt 40 extends along an axis that is angled or nonparallel to the bolt 40. In another embodiment of the invention, the pin 50 extends in a press fit through the bores 17, 19, 21. The leading end 52 of the pin 50 may be tapered to facilitate insertion of the pin through the bores 17, 19, 21.

In use, the ends 14 of the first spring leaf 12 are pivotally coupled to a frame of the vehicle body. The ends 14 when coupled to the vehicle are spaced apart by a distance that is shorter than the length of the first spring leaf 12, such that the suspension 10 extends arcuately between the ends 14. The middle section of the suspension 10 is then operatively coupled to an axle of the vehicle. The weight of the vehicle win tend to flatten the suspension 10. The curvature of the leaf springs 12, 16, 18, 20, however, functions like a spring to resist such flattening, thereby suspends the vehicle relative to the axle.

During transverse loading of the vehicle and suspension 10, the pin 50 prevents splaying or transverse separation of the leaf springs 16, 18, 20 other than the first leaf spring 12. By this arrangement, the pin 50 is able to substantially control splaying in the suspension 10. Additionally, the lack of a bore in the first leaf spring 12 eliminates the potential for an undesired stress concentration and promotes a relatively high level of reliability in the operative life of the suspension 10.

Figure 4:
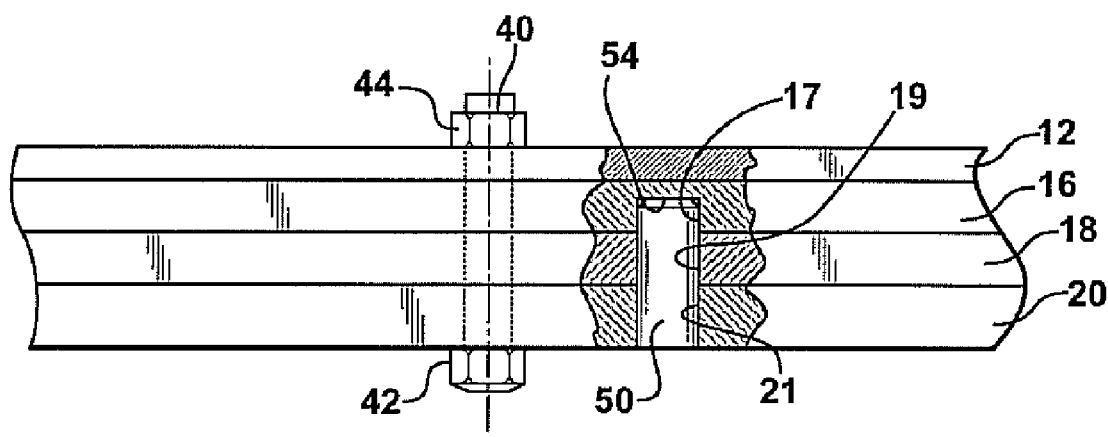
FIG. 4 is an enlarged side view of a leaf spring suspension according to a second embodiment of the invention.

In FIG. 4, a second embodiment of the suspension is shown, wherein a second leaf spring 16 adjacent the first leaf spring 12 includes a hole 17 that extends through a portion of a thickness of the second leaf spring 16. An end wall 54 is formed at the bottom of the hole 17, which prevents the pin 50 from protruding beyond a surface of the second leaf spring 16 adjacent the first leaf spring 12. The pin 50 extends through the bore 19, 21 of each leaf spring 18, 20 and into the hole 17 of the second leaf spring 16 to prevent splaying or transverse separation between the second leaf spring 16 and the other leaf springs 18, 20.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A vehicle suspension comprising:
   a plurality of leaf springs each having a generally rectangular cross section, each of the plurality of leaf springs having opposite ends and a middle section extending therebetween, the middle sections of each of the plurality of leaf springs being clampingly secured to each other by a fastener so that the plurality of leaf springs form a stack, a first leaf spring of the plurality of leaf springs having ends adapted to be coupled to a vehicle frame; and
   a pin extending through each of the plurality of leaf springs other than the first leaf spring for preventing separation between the plurality of leaf springs and for minimizing stress concentrations in the first leaf spring during loading of the vehicle suspension, said pin being adjacent to said fastener.

2. A vehicle suspension as set forth in claim 1, wherein the leaf springs incrementally decrease in length from the first leaf spring on one side of the stack to a last leaf spring on an opposite side of the stack.

3. A vehicle suspension as set forth in claim 1, wherein an end of the pin is tapered to facilitate insertion of the pin through a portion of the stack of leaf springs.

4. A vehicle suspension as set forth in claim 1, wherein said fastener is in the form of a bolt and nut for clampingly securing the plurality of leafs together to form the stack.

5. A vehicle suspension as set forth in claim 1, wherein the pin is generally parallel to said fastener.

6. A vehicle suspension as set forth in claim 1, wherein the leaf springs are arranged in the stack in a symmetrically opposite manner about said fastener.

7. A vehicle suspension as set forth in claim 6, wherein the pin is spaced apart from said fastener by a distance that is less than one quarter of the length of a shortest leaf spring in the stack.

8. A vehicle suspension as set forth in claim 7 including clamps for clamping together the leaf springs on opposite sides of said fastener.

9. A vehicle suspension as set forth in claim 8, wherein the shortest leaf spring is not clamped together with the other leaf springs, the clamps being outwardly spaced apart from the ends of the shortest leaf spring.

10. A vehicle suspension as set forth in claim 9, wherein the shortest leaf spring is on an opposite side of the stack relative to the first leaf spring.

11. A vehicle suspension comprising:
    a plurality of leaf springs each having a generally rectangular cross section, each of the plurality of leaf springs having opposite ends and a middle section extending therebetween, the middle sections of the plurality of leaf springs being clampingly secured to each other by a fastener so that the plurality of leaf springs form a stack,
    a first leaf spring in the stack having ends adapted to be pivotally coupled to a vehicle frame,
    a second leaf spring in the stack being disposed adjacent the first leaf spring, a hole being formed in a side of the second leaf spring opposite the first leaf spring and extending through a portion of a thickness of the second leaf spring, each leaf spring other than the first and second leaf springs having a bore extending therethrough; and
    a pin extending through the bores of each of the plurality of leaf springs and into the hole of the second leaf spring for preventing separation between the plurality of leaf springs and for minimizing stress concentrations in the first leaf spring during loading of the vehicle suspension, said pin being adjacent to said fastener.

12. A vehicle suspension as set forth in claim 11, wherein the leaf springs incrementally decrease in length from the first leaf spring on one side of the stack to a last leaf spring on an opposite side of the stack.

13. A vehicle suspension as set forth in claim 11, wherein an end of the pin is tapered to facilitate insertion of the pin through the bores and the hole.

14. A vehicle suspension as set forth in claim 11, wherein said fastener is in the form of a bolt and nut for clampingly securing the plurality of leafs together to form the stack.

15. A vehicle suspension as set forth in claim 11, wherein the pin is generally parallel to said fastener.

16. A vehicle suspension as set forth in claim 11, wherein the leaf springs are arranged in the stack in a symmetrically opposite manner about said fastener.

17. A vehicle suspension as set forth in claim 16, wherein the pin is spaced apart from said fastener by a distance that is less than one quarter of the length of a shortest leaf spring in the stack.

18. A vehicle suspension as set forth in claim 17 including clamps for clamping together the leaf springs on opposite sides of said fastener.

19. A vehicle suspension as set forth in claim 18, wherein the shortest leaf spring is not clamped together with the other leaf springs, the clamps being outwardly spaced apart from the ends of the shortest leaf spring.

20. A vehicle suspension as set forth in claim 19, wherein the shortest leaf spring is on an opposite side of the stack relative to the first leaf spring.

* * * * *

UNITED STATES PATENT AND TRADEMARK OFFICE
CERTIFICATE OF CORRECTION

PATENT NO. : 7,665,753 B2
APPLICATION NO. : 11/470328
DATED : February 23, 2010
INVENTOR(S) : Takeo Gennai Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 590 days.

Signed and Sealed this

Seventh Day of December, 2010

David J. Kappos
*Director of the United States Patent and Trademark Office*